Sept. 4, 1951      R. A. MANGIERI      2,566,899
COMBINATION POULTRY FEED TROUGH
Filed Aug. 8, 1949
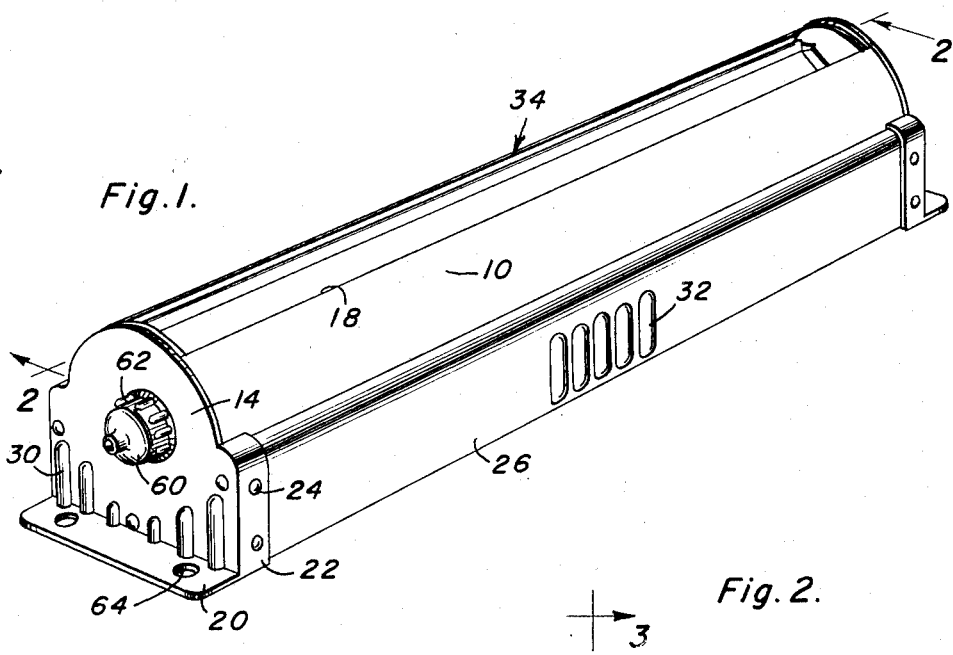
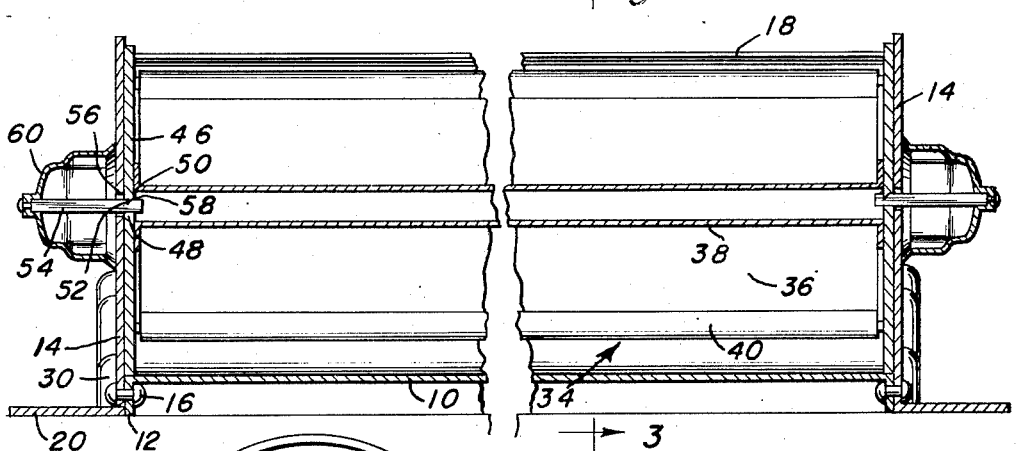
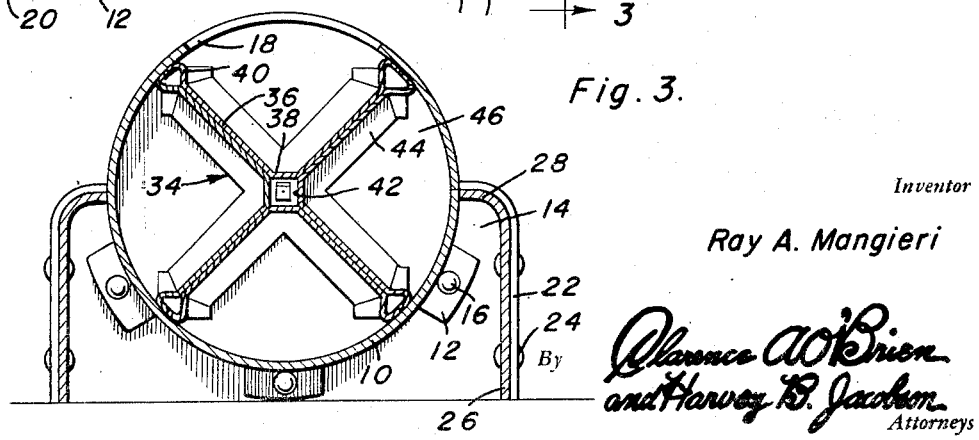
Inventor
Ray A. Mangieri
By Clarence A. O'Brien and Harvey B. Jackson
Attorneys Patented Sept. 4, 1951

2,566,899

UNITED STATES PATENT OFFICE 2,566,899

COMBINATION POULTRY FEED TROUGH

Ray A. Mangieri, New Kensington, Pa.

Application August 8, 1949, Serial No. 109,142

4 Claims. (Cl. 119—61)

This invention relates to new and useful improvements in poultry feeders and the primary object of the invention is to provide a casing having an access opening therein, a multiple feeding trough rotatably mounted in the casing and rotatable to bring a selected trough into registry with the access opening in the casing.

Another important object of the present invention is to provide a feeding trough that is light in weight facilitating transportation of the same in a convenient manner to a desired location for use, but which is extremely strong and durable in construction permitting poultry to contact the same without in any way harmfully affecting the trough.

Yet another object of the present invention is to provide a poultry feeding trough including a relatively small number of parts that are quickly and readily assembled in a minimum time so that the device can be manufactured at a cost beneficial to the purchasing poultry owners.

A further object of the present invention is to provide a poultry feeder including a casing and a feed holding member mounted in the casing that is quickly and readily removed from the casing to permit the casing and member to be cleaned in a convenient manner.

A still further object of the present invention is to provide a poultry feeder that is simple and practical in construction, efficient and reliable in operation, neat and attractive in appearance, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention;

Figure 2 is an enlarged longitudinal vertical sectional view taken substantially on the plane of section line 2—2 of Figure 1 and with parts broken away; and Figure 3 is a transverse vertical sectional view taken substantially on the plane of section line 3—3 of Figure 2.

Referring now to the drawings in detail, wherein for the purpose of illustration, there is disclosed a preferred embodiment of the present invention, the numeral 10 represents an elongated open-ended cylindrical housing having a group of circumferentially spaced attaching flanges or ears 12 at its ends that are secured to the inner faces of end walls or supports 14 by rivets or the like 16. The upper periphery of the housing 10 is provided with an entrance opening 18 and the edges defining the opening 18 are preferably rounded, by filing or by folding the edges inwardly, so that poultry will not cut or tear themselves on sharp edges.

The lower end portions of the supports 14 are turned outwardly to provide bearing feet or strips 20 and the side edges of the supports are extended inwardly toward each other to form attaching flanges 22 that are secured, by rivets or the like 24, to the ends of a pair of elongated side walls, supports or reinforcing members 26. The upper edges of the side supports 26 are rolled inwardly, as at 28, to rest against the outer periphery of the housing 10 intermediate the upper and lower peripheries of the housing.

Reinforcing and strengthening ribs or channels 30 are pressed outwardly from the end supports 14 and further reinforcing and strengthening ribs or channels 32 are pressed outwardly from the side supports 26. In addition to the strengthening and reinforcing effects given by the ribs, the same also add to the attractiveness of the instant poultry feeder.

A multiple trough or feed holding member, designated generally by the numeral 34, is mounted within the housing 10. The feed holding member 34 is composed of a plurality of circumferentially spaced substantially V-shaped troughs having sloping side walls 36 and inner walls 38. The side walls of adjacent troughs bear against each other and channels 40 are pressed in the walls 36 with the outer edges of adjacent walls 36 abutting as shown best in Figure 3 of the drawings. The troughs are so arranged as to provide a substantially square opening 42 defined by the walls 38.

The ends of the trough are provided with flanges 44 that are suitably secured to end plates or disks 46 having central, substantially square openings, 48. Inwardly beveled lugs 50 are formed on one edge of each of the edges defining the opening 48 and are yieldingly retained in recesses 52 in the inner ends of stub axles 54 that are journaled for rotation in apertures 56 in the end supports 14. Outwardly beveled lugs 58 are also formed on the inner ends of the stub axles 54 and lock behind the lugs 50, it being understood that the lugs 50 and 58 are complementally sloped to permit frictional locking engagement between the axles and the end plates 46.

Hollow cups or knobs 60 are secured to the axles 54 and circumferentially spaced finger grips or strengthening ribs 62 are pressed outwardly from the cups to permit a convenient handling of the knobs for rotating the member 34.

The flanges or bearing strips 20 are provided with any suitable number of apertures 64 that will receive fasteners whereby the instant structure may be detachably secured to a supporting structural element.

In practical use of the present invention, each of the troughs are filled with a suitable feed and the member 34 is manually rotated, by the knobs 60, to bring a selective trough into registry with the opening 18. As the feed is removed, by poultry, from the trough opposing the opening 18, the member 34 is again rotated to bring a further trough, filled with a suitable feed, into registry with the opening 18.

It should be noted, that the stub axles 54 could be detachably secured to the end plates 46 by threading the axles 54 to the disks 46. By so constructing the instant structure, it is apparent that by rotating the knobs 60 in one direction the same will lock the end supports between the end plates 46 and the knobs 60 to restrict rotation of the feed trough and thereby provide a means whereby the feed troughs or members 34 may be locked in a selected rotated position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A poultry feeder comprising an elongated open ended cylindrical casing, a pair of vertical end walls closing the ends of said casing and having lower horizontal flanges, attaching ears at the ends of said casing secured to and against the end walls, a pair of elongated vertical side walls paralleling said casing and having upper edges curved toward and engaging the casing, vertical attaching flanges on said end walls overlying the ends of said side walls and being secured to the ends of said side walls, and a feed holding member rotatably supported in said casing.

2. The combination of claim 1 and strengthening ribs integrally formed with said end walls.

3. A poultry feeder comprising an elongated open ended casing, a pair of end plates closing the ends of said casing and secured to the casing, a pair of elongated relatively low side walls terminally attached to the end plates and receiving the casing therebetween, said side walls including upper portions engaging said casing, said casing having an access opening, and a rotary feed holder mounted in said casing.

4. A poultry feeder comprising an elongated open ended horizontally disposed cylindrical casing, having an access opening in its upper periphery, a pair of elongated side walls paralleling said casing and receiving the casing therebetween, said side walls having upper inturned edges engaging the outer surface of the casing, a pair of vertical end walls closing the ends of said casing and including flanges overlapping the ends of said side walls and secured to the ends of said side walls, and a rotary feed holder mounted in said casing.

RAY A. MANGIERI.

REFERENCES CITED

The following references are of record in the file of this patent:

UNITED STATES PATENTS

| Number | Name | Date |
| --- | --- | --- |
| 589,152 | Baker | Aug. 31, 1897 |
| 1,200,275 | Tremper | Oct. 3, 1916 |
| 1,234,054 | McCandlish | July 17, 1917 |
| 1,257,861 | Herbert | Feb. 2, 1918 |
| 2,028,825 | Christiansen | Jan. 28, 1936 |
| 2,478,621 | Atulla | Aug. 9, 1949 |